United States Patent
Emoto et al.

(10) Patent No.: US 8,291,456 B2
(45) Date of Patent: Oct. 16, 2012

(54) VIDEO INFORMATION DISTRIBUTION AND DISPLAY SYSTEM

(75) Inventors: Norishige Emoto, Tokyo (JP); Masao Oki, Tokyo (JP); Yoichi Masubuchi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 609 days.

(21) Appl. No.: 10/591,077

(22) PCT Filed: Feb. 1, 2005

(86) PCT No.: PCT/JP2005/001413
§ 371 (c)(1),
(2), (4) Date: Aug. 30, 2006

(87) PCT Pub. No.: WO2006/082626
PCT Pub. Date: Aug. 10, 2006

(65) Prior Publication Data
US 2007/0182835 A1    Aug. 9, 2007

(51) Int. Cl.
*H04N 7/18* (2006.01)
(52) U.S. Cl. .............. 725/75; 725/32; 725/35
(58) Field of Classification Search ........... 725/38; 345/539; 382/166, 232–253
See application file for complete search history.

(56) References Cited

U.S. PATENT DOCUMENTS

| 4,910,683 A * | 3/1990 | Bishop et al. ........... 345/427 |
| 5,179,651 A * | 1/1993 | Taaffe et al. ........... 345/555 |
| 5,913,039 A * | 6/1999 | Nakamura et al. ........ 709/231 |
| 6,064,379 A * | 5/2000 | DeMoney .............. 715/203 |
| 6,133,910 A * | 10/2000 | Stinebruner ............ 725/49 |
| 6,625,750 B1 * | 9/2003 | Duso et al. ............ 714/11 |
| 6,804,824 B1 * | 10/2004 | Potrebic et al. .......... 725/38 |
| 2003/0046687 A1 * | 3/2003 | Hodges et al. ........... 725/32 |

FOREIGN PATENT DOCUMENTS

| JP | 51-023031 | 2/1976 |
| JP | 63-082078 | 4/1988 |
| JP | 07-225577 | 8/1995 |

(Continued)

OTHER PUBLICATIONS

Japanese Decision of Refusal, with English-Language Translation, dated Oct. 14, 2008.

(Continued)

*Primary Examiner* — Nicholas Corbo
(74) *Attorney, Agent, or Firm* — Buchanan Ingersoll & Rooney PC

(57) ABSTRACT

Problem

In the case of displaying text information, a static image and a dynamic image on an image display device carried on a train or car in accordance with designated schedule, a blank period that can be visually recognized by human eyes occurs when displaying a compressed static image by switching from a previous video image. Thus, there is a problem of discomfort such as lack of real-time property and difficulty in viewing by a viewer.

Means for Solution

In a video information distribution and display system carried on a train or car, compressed static image video information scheduled to be displayed next is expanded and prepared by extracting and storing into a display storage part in advance, or the like, in accordance with an image control signal (display command) sent thereto together with video information, and the static image is displayed by seamlessly switching from a currently displayed video image at content switching timing of the display command.

12 Claims, 10 Drawing Sheets

FOREIGN PATENT DOCUMENTS

| | | | |
|---|---|---|---|
| JP | 10-143104 | | 5/1998 |
| JP | 2002-209193 A | | 7/2002 |
| JP | 2002209193 A | * | 7/2002 |
| JP | 2002262215 A | | 9/2002 |
| JP | 2002287727 A | | 10/2002 |
| JP | 2004-040697 | | 2/2004 |

OTHER PUBLICATIONS

Office Action (Second Notification of Examination Opinion) from the Chinese Patent Office in a corresponding Chinese patent application dated Jan. 15, 2010 and an English-language translation, 4 pages.

* cited by examiner

FIG. 5

SCHEDULE DATA

| DISPLAY ORDER | IDENTIFICATION CODE | DISPLAY TIME | |
|---|---|---|---|
| 1 | #001 | 15 SECONDS | STATIC IMAGE CONTENT |
| 2 | #002 | 17 SECONDS | STATIC IMAGE CONTENT |
| 3 | #003 | 20 SECONDS | STATIC IMAGE CONTENT |
| 4 | #101 | 30 SECONDS | DYNAMIC IMAGE CONTENT |
| 5 | #004 | 15 SECONDS | STATIC IMAGE CONTENT |
| 6 | #005 | 15 SECONDS | STATIC IMAGE CONTENT |
| 7 | #006 | 15 SECONDS | STATIC IMAGE CONTENT |

REPEAT

VIDEO INFORMATION DISTRIBUTION AND DISPLAY SYSTEM

TECHNICAL FIELD

This invention relates to a video information distribution and display system that distributes and displays video information such as dynamic images and static images, for example, in a train, car or the like.

BACKGROUND ART

In trains operated in recent years, gathering, monitoring and control of train information of vehicle-borne device on each car, for example, doors, air-conditioner, brake, motor, ATO (automatic train operator), SIV (static inverter as auxiliary power source), automatic broadcasting device and the like, is generally performed for the purpose of more comfortable operation and efficient and safe operation, and for the purpose of quick recovery from an accident, trouble or the like, if any. A digital transmission line is used to gather, monitor and control this train information. Since the recent network technique enables application of a large-capacity digital transmission line, it is possible to distribute other information than the above-described train information, for example, image information and the like.

Recently, in addition to the above-described monitoring and control that is necessary for train operation, it is also planned and partly carried out to gather, distribute and monitor forward video images and rear video images of trains and video images of platforms of stations for safer operation, and to display characters, dynamic images and static images on a display panel provided in each car in order to provide information that should be provided to passengers with respect to train operation, for example, status information when the arrival time is changed or the operation is disrupted, and various services such as weather forecast, news and advertisement. It is contemplated to provide Internet connection services mainly in mid- and long-distance trains in the future. The distribution and display of various information such as digital data and video information in trains in this manner will obviously become much more necessary, and amenities including visibility, easiness in viewing and the like, as well as improvement in its efficiency, reliability and real-time characteristic, must be considered.

In a conventional video information distribution and display system, a static image is transmitted in the form of digital static image video information processed (hereinafter referred to as compressed) to reduce the data volume. In a display device, a video image to be displayed is recognized using an image control signal, and if the video image is a static image, the state before the processing of the compressed static image video information is restored (hereinafter referred to as extraction), then stored in a display storage part, and subsequently displayed. When a video image that is currently displayed is a static image, the image is displayed using the display storage part where the static image video information is stored. Therefore, as a matter of course, the image cannot be displayed while the next static image video information to be displayed is being extracted and stored into the display storage part. This period is a blank period (see, for example, Patent Reference 1.

Patent Reference 1: JP-A-2002-209193

In this conventional system, compressed digital static image video information and an image control signal are digitally transmitted using an already installed train information device and transmission line, whereas a dynamic image is distributed to and displayed on the display device by analog transmission. The reason for this is as follows. Recently, a static image such as photograph is often picked up, edited and transmitted as digital data, and transmitting and displaying digital data as it is, is more efficient than carrying out analog conversion. Moreover, though high resolution of approximately XGA (1024×768) is necessary for sharply displaying a static image containing a large number of characters in small font, such as photograph or magazine advertisement, data compression allows approximately 100 to 200 K transmission bytes per image. If the conventionally employed transmission system (packet system) is utilized for linkage between train information devices, static image video information of high resolution can be distributed at a low cost.

Meanwhile, in the case of a dynamic image that is displayed at a high speed of 30 frames per second, the resolution equivalent to that of a static image is not necessary and resolution of approximately 480×320 suffices. Transmission of dynamic image video information according to the digital data system is technically possible. However, particularly the modulation and demodulation mechanism is complicated, and at the present stage, the analog transmission system is suitable as the dynamic image distribution system for the video information distribution and display system in trains because of the high cost.

In the display device, when displaying a static image based on an incoming image control signal, compressed data is extracted and subsequently displayed, as a matter of course.

DISCLOSURE OF THE INVENTION

Problems that the Invention is to Solve

In the conventional video information distribution and display system as described above, when displaying a static image, it takes several seconds to read compressed digital static image video information, extract and store data into the display storage part, and display the data. Therefore, when switching from a static image to another static image, there is a problem that a blank period (several seconds) exists which human eyes can clearly perceive.

This invention is made to solve the problems as described above and its object is to provide a video information distribution and display system that can totally eliminate a blank period or setting an arbitrary time period as a blank period in switching a static image to another static image.

Means for Solving the Problems

A video information distribution and display system according to this invention has a video information distribution device that distributes and outputs video information including dynamic image video information and processed digital static image video information, and an image control signal, and a video information receiving and display device that receives and displays the video information, characterized in that the video information receiving and display device restores in advance a state before processing of processed digital static image video information of a next static image to be displayed, in accordance with an instruction of the image control signal, and stands by for next display.

Advantage of the Invention

According to this invention, when switching video images to be displayed in the video information distribution and display system, a delay or blank period perceived by human eyes can be totally eliminated or caused to be an arbitrary time period.

BRIEF DESCRIPTION OF THE DRAWINGS

FIG. 5 is a view showing schedule data according to Embodiments 1 and 2.

Figure 1:
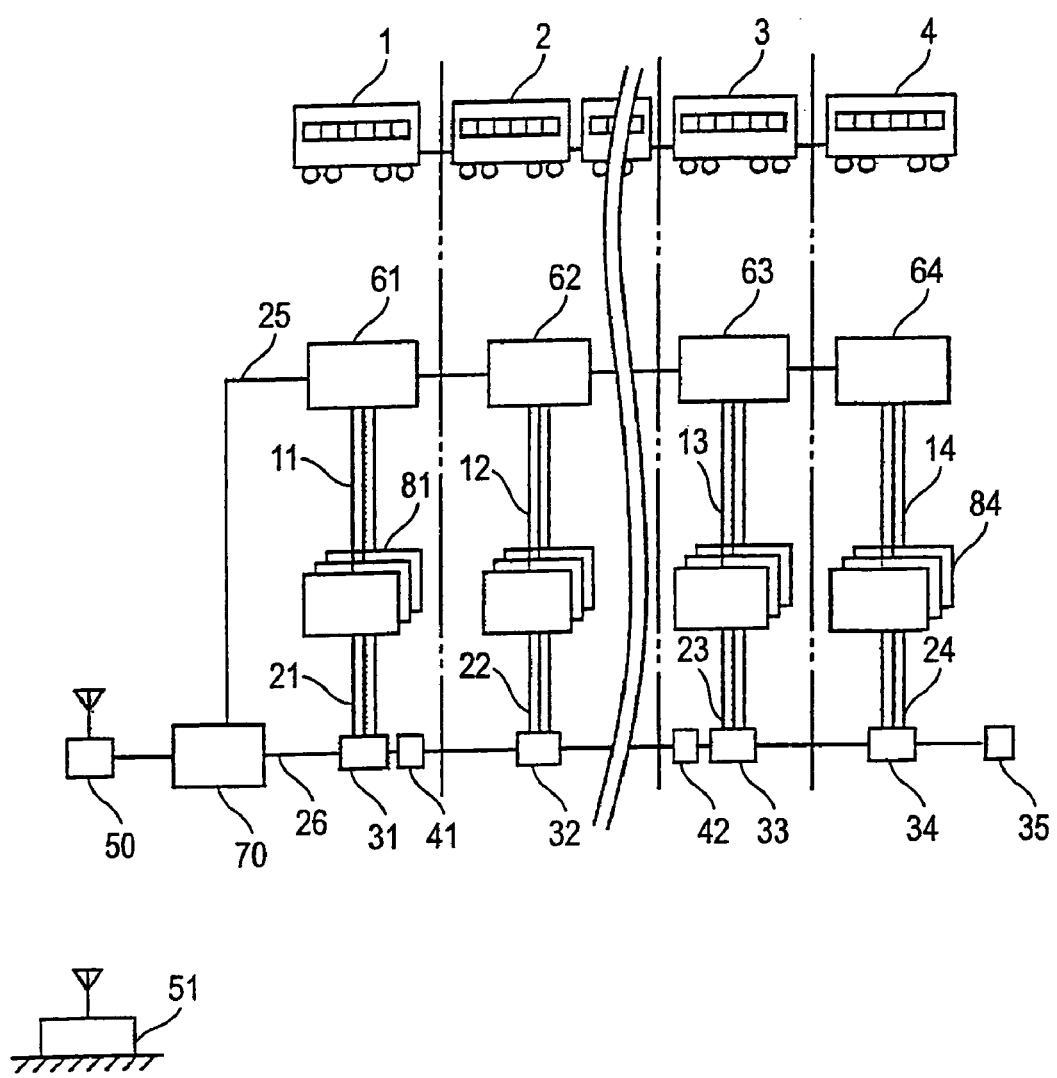
FIG. 1 is a structural view of a video information distribution and display system according to Embodiment 1.

DESCRIPTION OF REFERENCE NUMERALS AND SIGNS 1-4 car, 11-14 transmission line, 21-24 transmission line, 25 digital transmission line, 26 transmission line, 31-34 branch device, 35 terminating device, 41-42 amplifier, 50 radio transmission/receiving device, 51 terrestrial station, 61-64 train information device, 70 video information distribution device, 81-84 video information receiving and display device

BEST MODE FOR CARRYING OUT THE INVENTION

Embodiment 1

FIG. 1 is a view showing the overall schematic structure in the case where a video information distribution and display system of this invention is carried on, for example, a train, as Embodiment 1. In the drawing, the train includes cars 1 to 4, and in order to simply the description, the other cars than the cars 1 to 4 are not shown. In this train, train information devices 61 to 64 are carried in the respective cars 1 to 4 and perform processing of train information including train operation information such as train stop station information and arrival time, train position information indicating the kilometer distance from a starting station or the like, and vehicle-borne device information such as door open/close command. The train information device 61 in the car 1 is connected to various control operation devices such as master controller. The train information devices 61 to 64 carried in the respective cars are interconnected via a digital transmission line 25 laid between the cars and perform input/output processing of the various train information.

The video information distribution device 70 carried in the car 1 is connected with the train information device 61 in the same car by the digital transmission line 25. It inputs the train information for train operation, and distributes and outputs compressed digital static image video information (hereinafter referred to as static image video information) and an image control signal (hereinafter referred to as display command), using these train information devices 61 to 64 and digital transmission line 25. The reason for sending the display command through the digital transmission line is that it is reasonable to digitally transmit the display command, which is bit information, together with the static image video information as digital information.

By connecting the train information devices 61 to 64 carried in the respective cars with video information receiving and display devices 81 to 84 carried in the respective cars by transmission lines 11 to 14, the static image video information and display command distributed and outputted from the video information distribution device 70 are transmitted to the video information receiving and display devices 81 to 84.

Moreover, the video information distribution device 70 is connected to the video information receiving and display devices 81 to 84 carried in the respective cars via a transmission line 26 laid between the cars, branch devices 31 to 34 provided in the respective cars, for example, amplifiers 41 and 42 inserted at individual positions on the transmission line 26, a terminating device 35, and transmission lines 21 to 24, and transmits dynamic image video information in the form of analog signal to the video information receiving and display device 81 to 84 via these transmission lines 21 to 24.

A radio transmission/receiving device 50 is connected to the video information distribution device 70. It inputs, by wireless, content data such as so-called real-time information including news and weather forecast, and emergency messages and the like, and schedule data for indicating display order and display time of content display as shown in FIG. 5, and outputs these data to the video information distribution device 70. In many cases, plural units of the video information receiving and display devices 81 to 84 are installed in the respective cars. FIG. 1 shows an example where three video information receiving and display devices are carried in each car.

Figure 2:
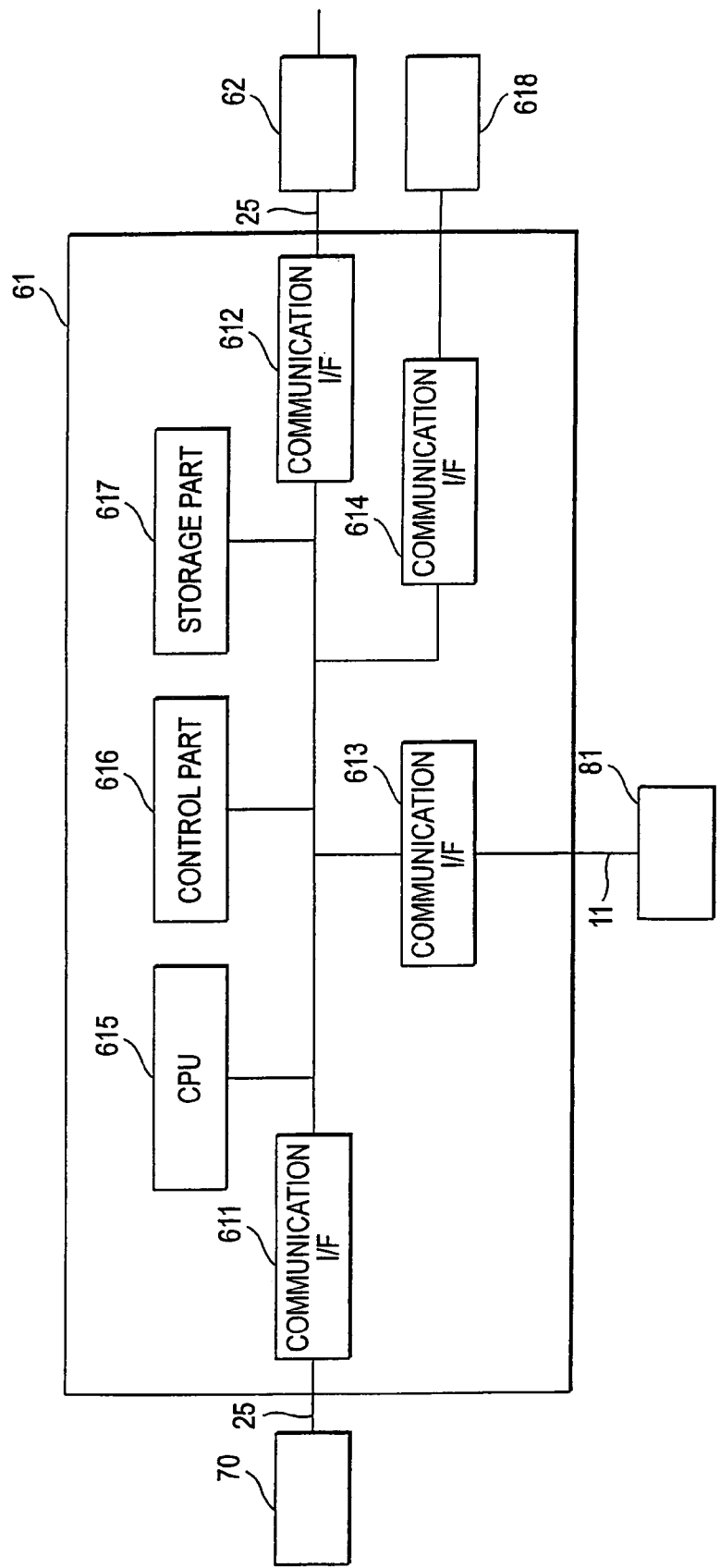
FIG. 2 is a structural view of a train information device 61 according to Embodiment 1.

FIG. 2 shows the internal structure of, for example, the train information device 61, carried in each car. The video information distribution device 70 and the train information device 62 carried in the next car are connected with each other via the digital transmission line 25. In Embodiment 1, the static image video information and display command are transmitted using this digital transmission line 25. Each communication I/F (interface) connects an external transmission line with a data bus within a device, and performs series/parallel conversion and protocol conversion with the external transmission line, as in the other drawings. A vehicle-borne device 618 connected to a communication I/F 614 includes a door, air-conditioner, brake, motor, ATO, SIV, automatic broadcasting device and the like. Each train information device has the function of packet-transmitting digital data indicating the status of these devices, and the function of performing a necessary control operation on the basis of these status data. The train information device is connected with the video information receiving and display device 81 by the transmission line 11 and transmits the static image video information and display command outputted from the video information distribution device 70. FIG. 2 shows, for example, the train information device 61 carried in the car 1. However, in the case of the train information device in a middle car, the neighboring train information devices are connected to a communication I/F 611 and a communication I/F 612 in FIG. 2. A CPU 615 takes charge of data transmission/receiving processing carried out through each communication I/F, and a control part 616 controls the vehicle-borne device 618. A storage part 617 temporarily stores data in the processing of transmitted/received data or control data output processing and also stores software to operate the CPU 615.

Figure 3:
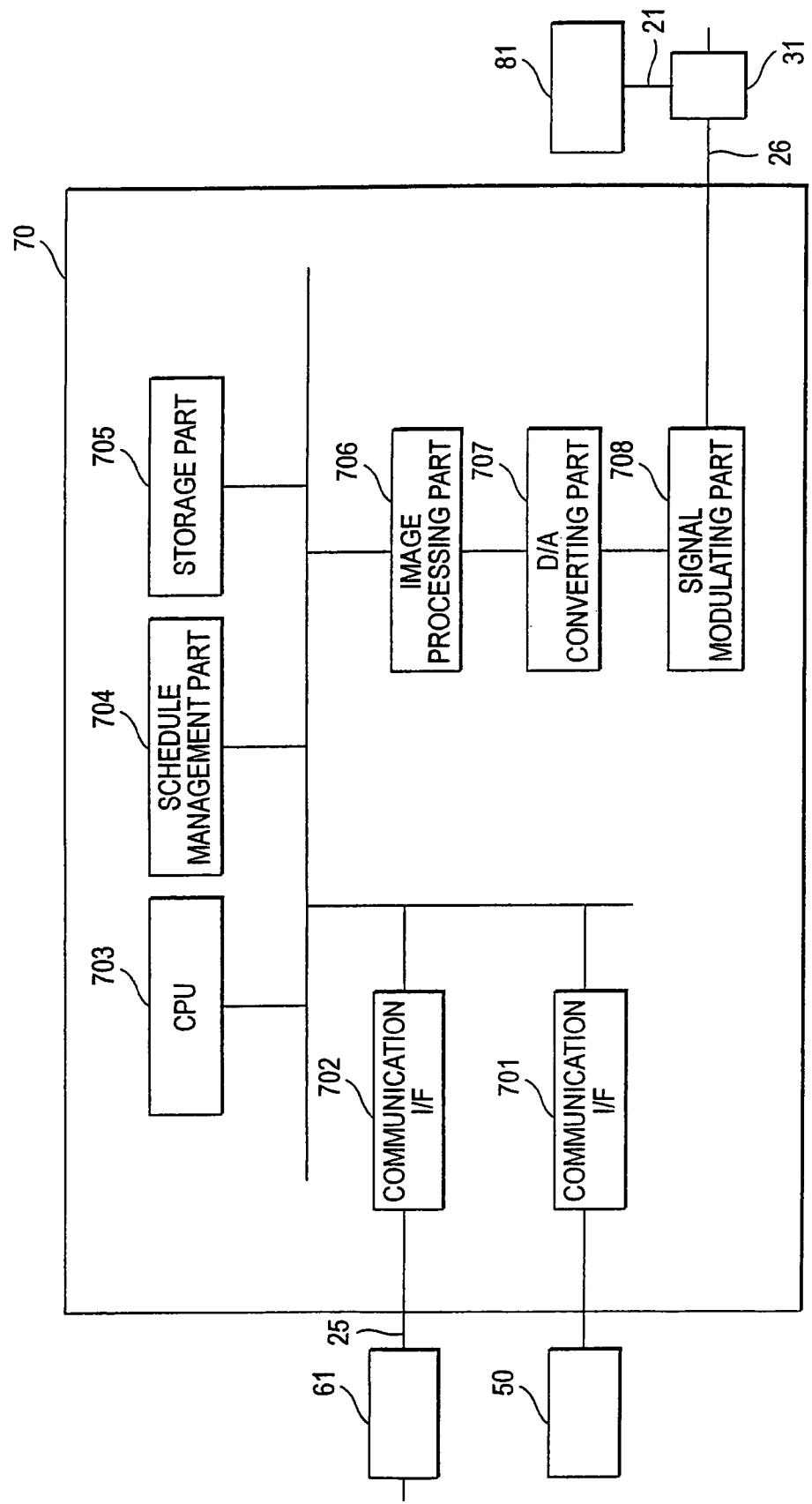
FIG. 3 is a structural view of a video information distribution device 70 according to Embodiment 1.

FIG. 3 shows the internal structure of the video information distribution device 70. Various content data such as video information and schedule data are received from the radio transmission/receiving device 50 via a communication I/F 701. Of the received video information, static image video information is sent to, for example, the train information device 61 via the digital transmission line 25. For dynamic image information, an image processing part 706 performs noise elimination processing and contrast and color adjustment processing. Moreover, after analog conversion by a D/A converting part 707, the information is signal-converted to a high-frequency range by a signal modulating part 708 and distributed to, for example, the video information receiving and display device 81 via the transmission line 26, branch device 31 and transmission line 21.

A CPU 703 takes charge of data transmission/receiving processing carried out through each communication I/F. A schedule management part 704 generates a display command for content switching on the basis of the schedule data received from the radio transmission/receiving device 50. The generated display command is sent together with the static image video information to, for example, the train information device 61 via the digital transmission line 25. A storage part 705 temporarily stores data in the processing of transmitted/received data and also stores software to operate the CPU 703.

Figure 4:
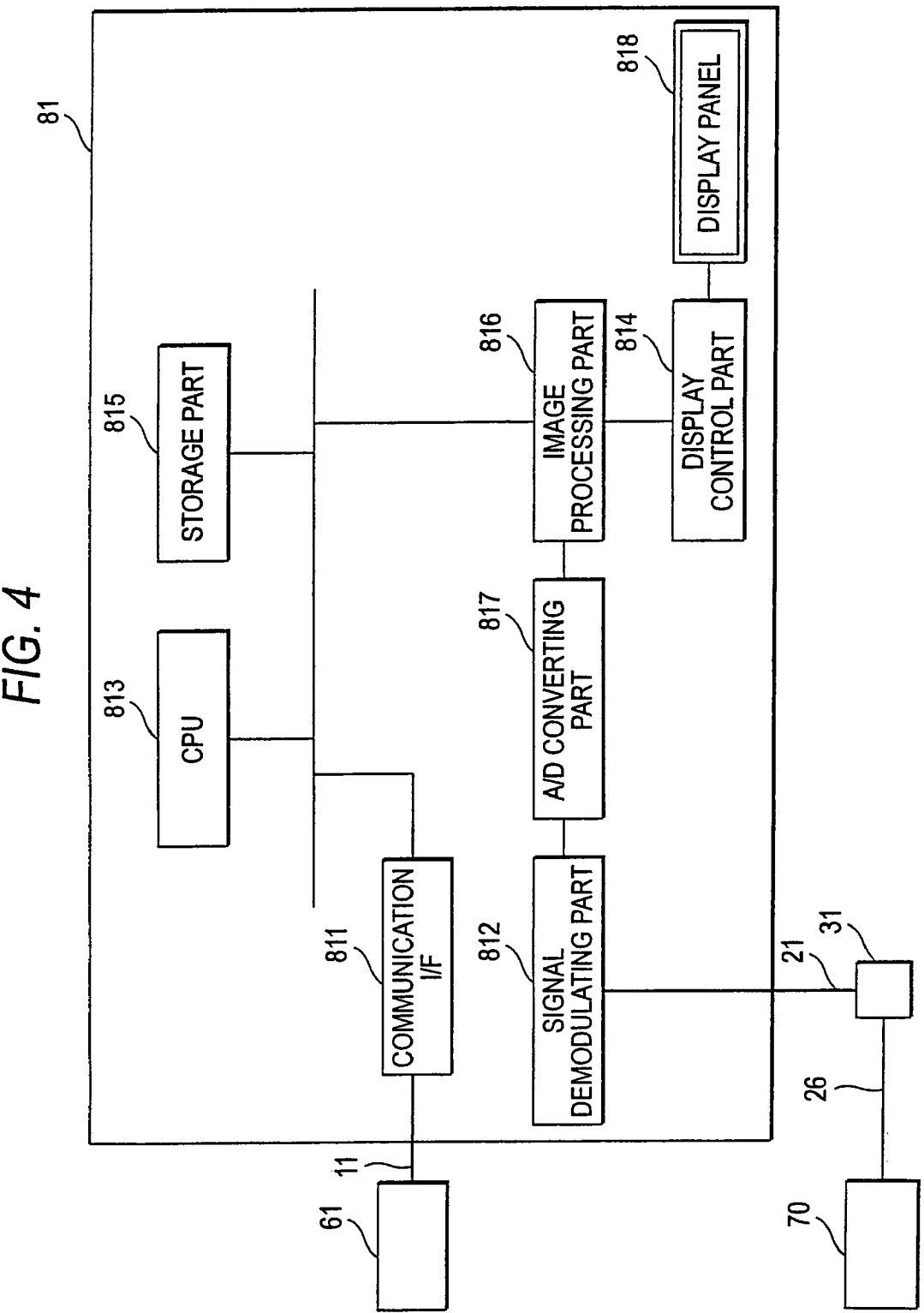
FIG. 4 is a structural view of a video information receiving and display device 81 according to Embodiment 1.

FIG. 4 shows the internal structure of, for example, the video information receiving and display device 81 carried in each car. The dynamic image video information in the form of analog data signal as a result of high-frequency analog modulation in the video information distribution device 70 is demodulated by a signal demodulating part 812 and subsequently digitized by an A/D converting part 817. Change of the screen size and superimposing processing of text information are performed by an image processing part 816, and a display processing part 814 performs control to display digital video information on a digital display panel 818 represented by a liquid crystal panel or the like. Meanwhile, the static image video information transmitted from the train information device 61 via the transmission line 11 is extracted and stored into a storage part 815 in accordance with the display command that is sent thereto simultaneously. A CPU 813 takes charge of processing of data received via a communication I/F 811. The storage part 815 stores the extracted static image video information as described above and also stores software to operate the CPU 813.

There are two storage areas for storing static images to be displayed, and which should be displayed is determined by the value of a content designation flag. As the value of the content designation flag changes in accordance with a switching command and the static image to be displayed is switched, the static image designated by a content identification code contained in the switching command is stored into the storage area that is not used for display, as the next static image to be displayed. Thus, the preparation is done. Hence, when switching from a static image to another static image and when switching from a dynamic image to a static image, seamless switching of contents can be realized without having any delay and almost without displaying a blank screen.

FIG. 5 shows schedule data for six types of static image contents and one type of dynamic image content, that is, seven types of contents in total. The schedule data includes the display order and display time of each content, and an identification code of each content data.

Figure 6:
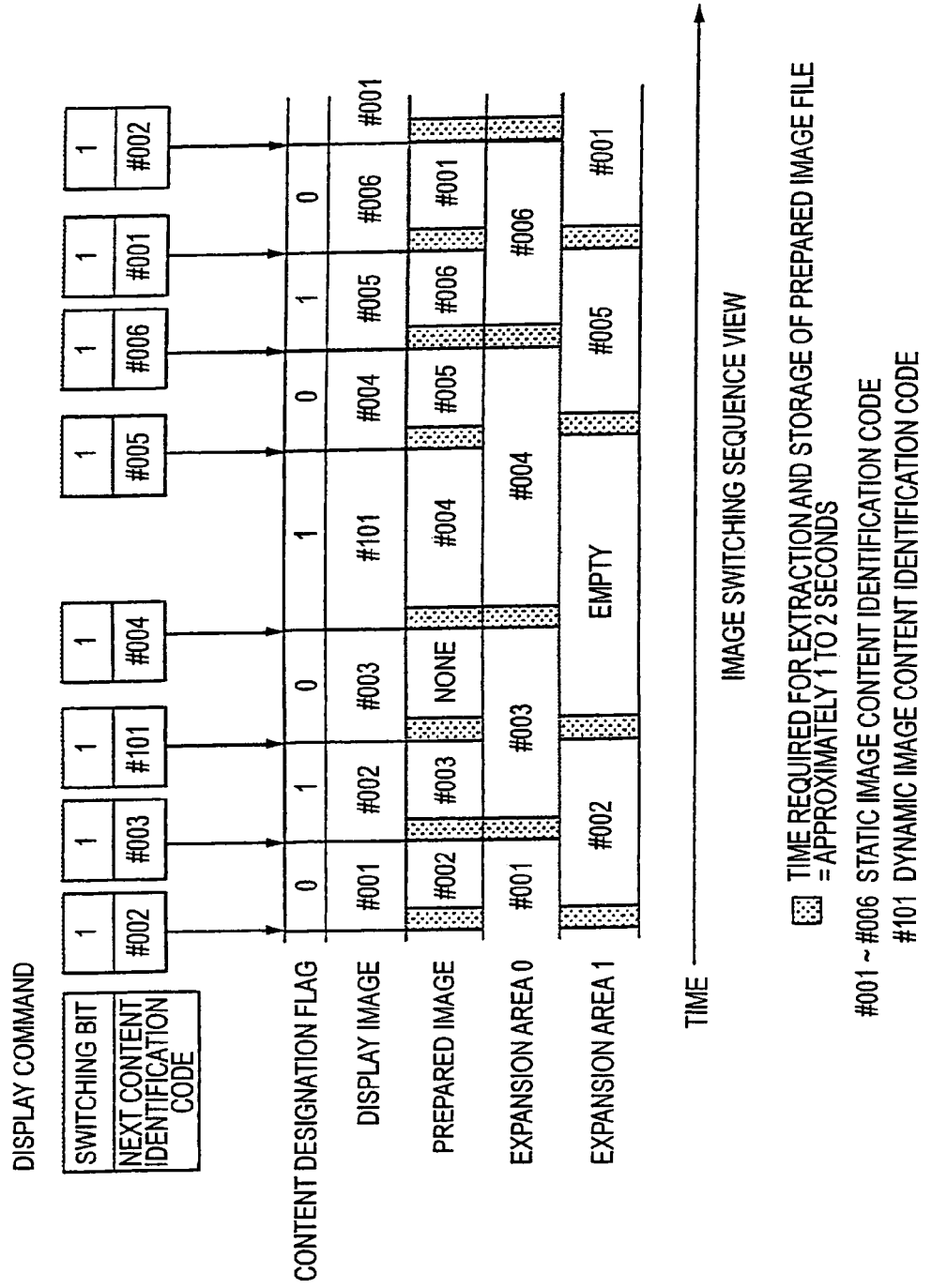
FIG. 6 is a view showing a display image switching operation according to Embodiments 1 and 2.

FIG. 6 shows an image switching sequence, for example, in the video information receiving and display device 81, together with the timing of generating a display command. The horizontal axis is the time base. In the image switching sequence, one of the two storage areas is assumed to be an expansion area 0 and the other is assumed to be an expansion area 1. The relation between a displayed image and a prepared image is shown with respect to time. The timing of generating a display command including a switching bit and a next content identification code of a content to be displayed at the time of next switching is shown by an arrow. The display order is according to the schedule data of FIG. 5.

Figure 7:
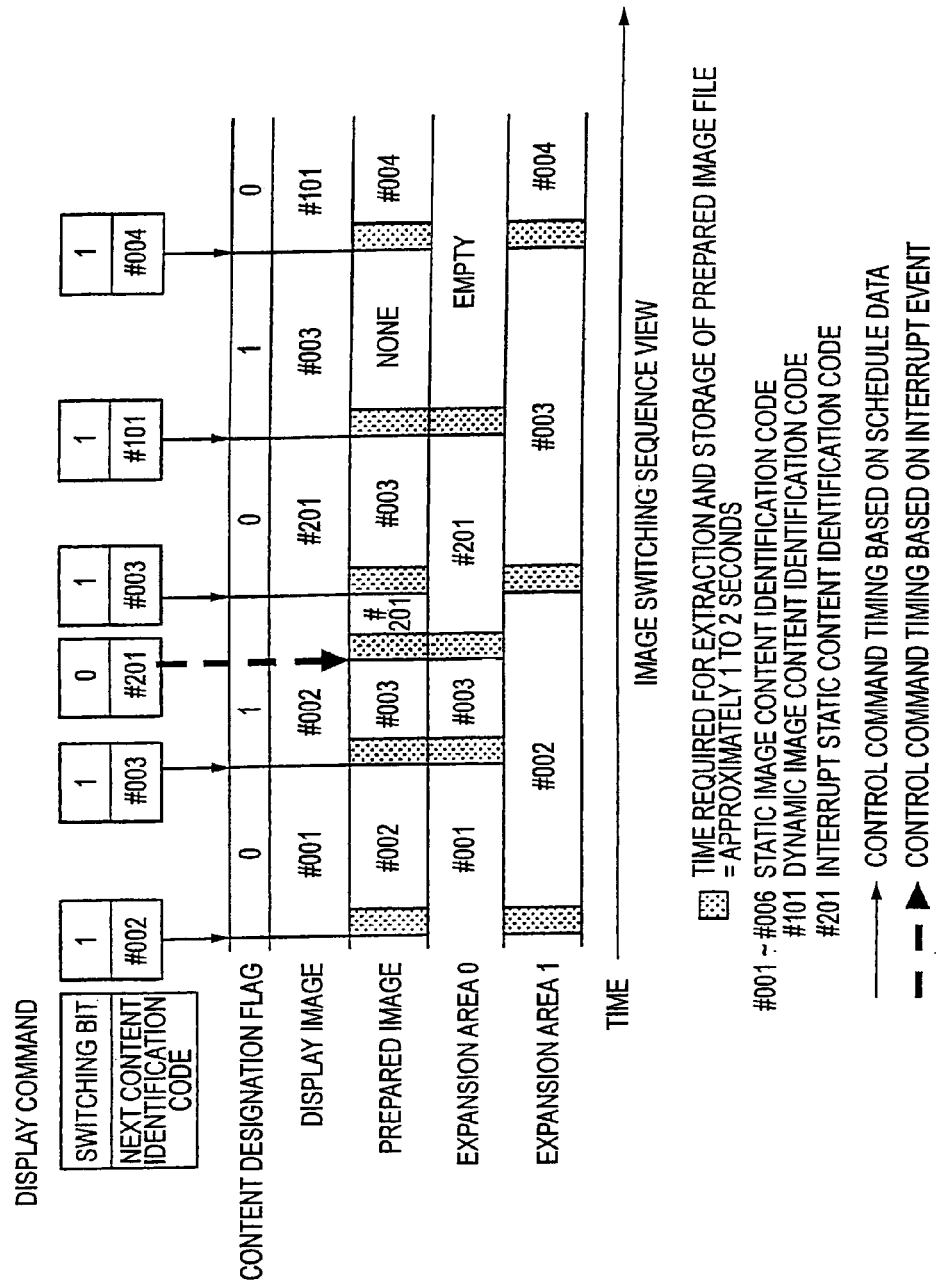
FIG. 7 is a view showing a display image switching operation according to Embodiments 1 and 2.

FIG. 7 is similar to FIG. 6. However, FIG. 7 shows a sequence in the case where an event interruption such as next station guide occurs, and the timing of generating a display command. In this example, an event interruption occurs to display the static image content of #201 while displaying the static image content of #002.

Next, operations will be described. First, a switching operation from a static image to another static image, that is, a switching operation from identification code #001 to #002 in FIG. 6, will be described as an example.

In FIG. 6, in the state where the static image of identification code #001 is displayed, the content designation flag is "0". The static image of identification code #001 is stored into the expansion area 0 of the storage part of the video information receiving and display device 81 and used as a display image. The static image of identification code #002 is stored into the expansion area 1 and prepared as the next content to be displayed.

The schedule management part 704 of the video information distribution device 70 sends a switching command having a switching bit of 1 and a next content identification code of #003 to the train information device 61 at the timing of content switching. The video information receiving and display device 81 receives this switching command via the digital transmission line 25 and the transmission line 11 between the train information devices. The video information receiving and display device 81 switches the content designation flag from "0" to "1" in accordance with the received switching command, switches the display image to the static image of the identification code #002 prepared in the expansion area 1, and stores the static image of identification code #003 into the expansion area 0 to prepare for the next switching. As the operation is done in this manner, seamless display can be made almost without having a delay or blank screen that can be perceived by human eyes when switching from a static image to another static image.

Next, a switching operation from a static image to a dynamic image and further to a static image, that is, in FIG. 6 a switching operation from identification code #003 to #101 and further to #004, will be described as an example.

First, in the state where the static image of identification code #003 is displayed, the content designation flag is "0". The static image of identification code #003 is stored into the expansion area 0 of the storage part 815 of the video information receiving and display device 81 and used as a display image. The expansion area 1 is empty.

The schedule management part 704 of the video information distribution device 70 sends a switching command having a switching bit of 1 and a next content identification code of #004 to the train information device 61 at the timing of content switching. The video information receiving and display device 81 receives this switching command via the digital transmission line 25 and the transmission line 11. The video information receiving and display device 81 switches the content designation flag from "0" to "1" in accordance with the received switching command, switches the display image from the static image to the dynamic image received via transmission line 21, and stores the static image of identification code #004 into the expansion area 0 to prepare for the next switching.

Then, the schedule management part 704 of the video information distribution device 70 sends a switching command having a switching bit of 1 and a next content identification code of #005 to the train information device 61 at the timing of content switching. The video information receiving and display device 81 receives this switching command via the digital transmission line 25 and the transmission line 11, and switches the display image from the dynamic image of next content identification code #101 to the static image of identification code #004 stored and prepared in the expansion area 0. As the operation is done in this manner, seamless display can be made almost without having a delay or blank screen that can be perceived by human eyes when switching from a static image to a dynamic image and further to another static image.

Next, the operation in the case where an event interruption occurs will be described with reference to FIG. 7. The schedule management part 704 of the video information distribution device 70 generates an interrupt command having a switching bit of "0" and a next content identification code of #201, there by making an instruction to display a next station guide (static image content of identification code #201) on the basis of the train information received from the train information device 61. The generated interrupt command is sent to the train information device 61 and is received by the video information receiving and display device 81 via the transmission line 11. The schedule management part 704 of the video information distribution device 70 refers to the schedule data, and if the time to the next switching timing is sufficiently longer than the time (one to two seconds) required for extraction and storage of static image video information (for example, the time is five seconds or longer), the schedule management part 704 immediately sends an interrupt command. If the time is not sufficiently long (for example, less than five seconds), the schedule management part 704 sends a switching command at the next switching timing and subsequently sends an interrupt command.

The video information receiving and display device 81 recognizes that an interrupt event has occurred, from the switching bit of "0" of the received control signal, and also judges that the area for prepared image is the expansion area 0 because the content designation flag at that point is "1". The video information receiving and display device 81 extracts and stores the static image of identification code #201 into the expansion area 0 and overwrites the already stored #003.

The schedule management part 704 of the video information distribution device 70 sends a switching command that designates, as the next content identification code, the static image of identification code #003 previously overwritten in the static image expansion area 0 in the video information receiving and display device 81, at the content end timing of #002. The video information receiving and display device 81, having received this switching command, causes the content of #201 already stored in the expansion area 0 to be displayed as a display image, and stores the content of #003 designated by the next content identification code into the expansion area 1. The similar processing is carried out in the other video information receiving and display devices 82 to 84, too.

As described above, in Embodiment 1 of this invention, content switching control from a static image to another static image and from a dynamic image to a static image can be carried out without any delay, and almost no interruption or stop of the display image occurs, and the blank period can be totally eliminated or caused to be an arbitrary time period. Also, the timing of displaying the next station guide or the like depends on the traveling status of the train, and it is possible to seamlessly switch the content that cannot be controlled at timing scheduled in advance.

At the time of this screen switching, the blank period can be totally eliminated or caused to be an arbitrary time period, because the storage part for extracting and storing the static image video information of a static image to be displayed and the storage part used by the currently displayed video image are separate and therefore the next static image to be displayed is already prepared at the time when a display command for displaying the next static image to be displayed is received. Thus, the blank period can be totally eliminated or caused to be an arbitrary time period.

Although in Embodiment 1, a display command is transmitted together with static image video information through the digital transmission line, transmitting the display command through another transmission line has a similar effect. Moreover, while, in this example, the static image video information of a static image to be displayed next to the currently displayed video image is extracted in advance to stand by and prepare, it is also possible to extract the static image video information of a static image to be displayed next to the next static image as far as can be known from the schedule data, and thus to stand by and prepare.

Embodiment 2

Next, the structure and operation of Embodiment 2 will be described with reference to FIGS. 8 to 10.

Figure 8:
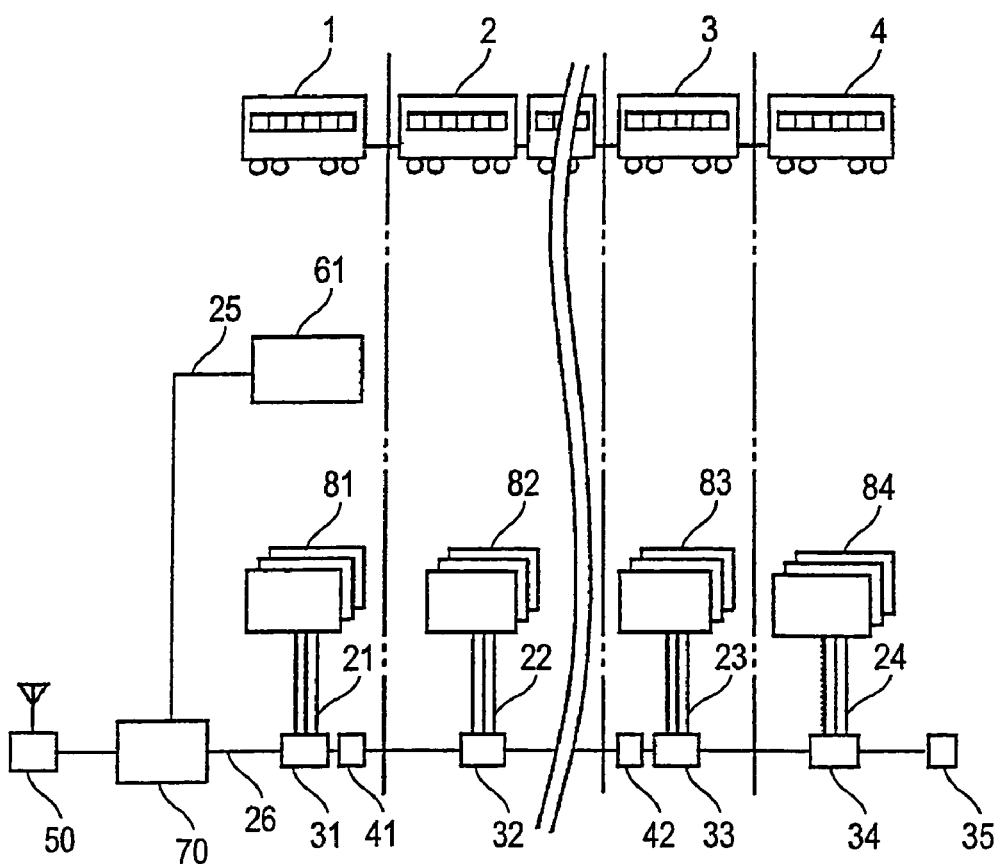
FIG. 8 is a structural view of a video information distribution and display system according to Embodiment 2.

FIG. 8 is a view showing the overall schematic structure of a video information distribution and display system according to Embodiment 2. A video information distribution device 70 multiplexes static image video information and a display command to dynamic image video information and transmits these to video information receiving and display devices 81 to 84 via a transmission line 26 and transmission lines 21 to 24. Therefore, the train information devices 61 to 64, the transmission line 25 and the transmission lines 11 to 14 that transmit static image video information in Embodiment 1 are not necessary for transmitting video information. A train information device 61 and a transmission line 25 shown in FIG. 8 are for processing train information such as vehicle-borne device information that is necessary for train operation.

The method for multiplexing static image video information and a display command to dynamic image video information is as follows. That is, a dynamic image analog signal of the NTSC video signal system sent to the video information receiving and display devices 81 to 84 includes an area that is not actually used for screen display, between a frame and the next frame of a screen, which is called VBI (vertical blanking interval). Digital information of static image video information and a display command is inserted into this VBI and thus distributed. Using this VBI area for data transmission is broadly carried out in teletext or the like in television broadcast. This is not described in detail here.

Figure 9:
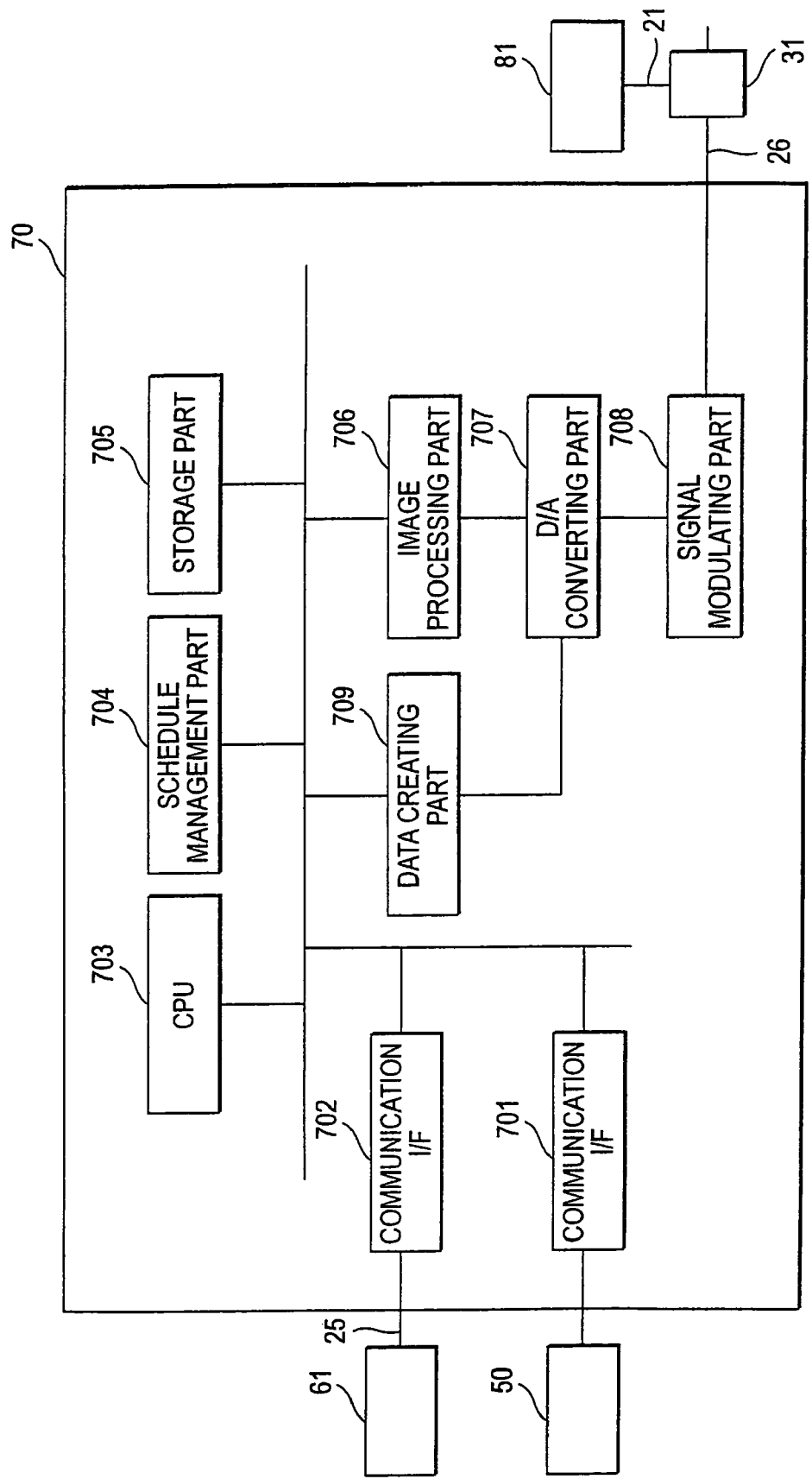
FIG. 9 is a structural view of a video information distribution device 70 according to Embodiment 2.

FIG. 9 shows the internal structure of the video information distribution device 70 according to Embodiment 2. A data creating part 709 creates static image video information and a display command to be sent, and a D/A converting part 707 multiplexes the static image video information and display command to a VBI area of an analog video signal that is dynamic image video information. The multiplexed dynamic image video information is modulated to a predetermined signal system by a signal modulating part 708 and subsequently sent to the video information receiving and display device 81 via the transmission line 26 and via the branch device 31 and the transmission line 21, for example. The other blocks are the same as in the description of FIG. 3 in Embodiment 1.

Figure 10:
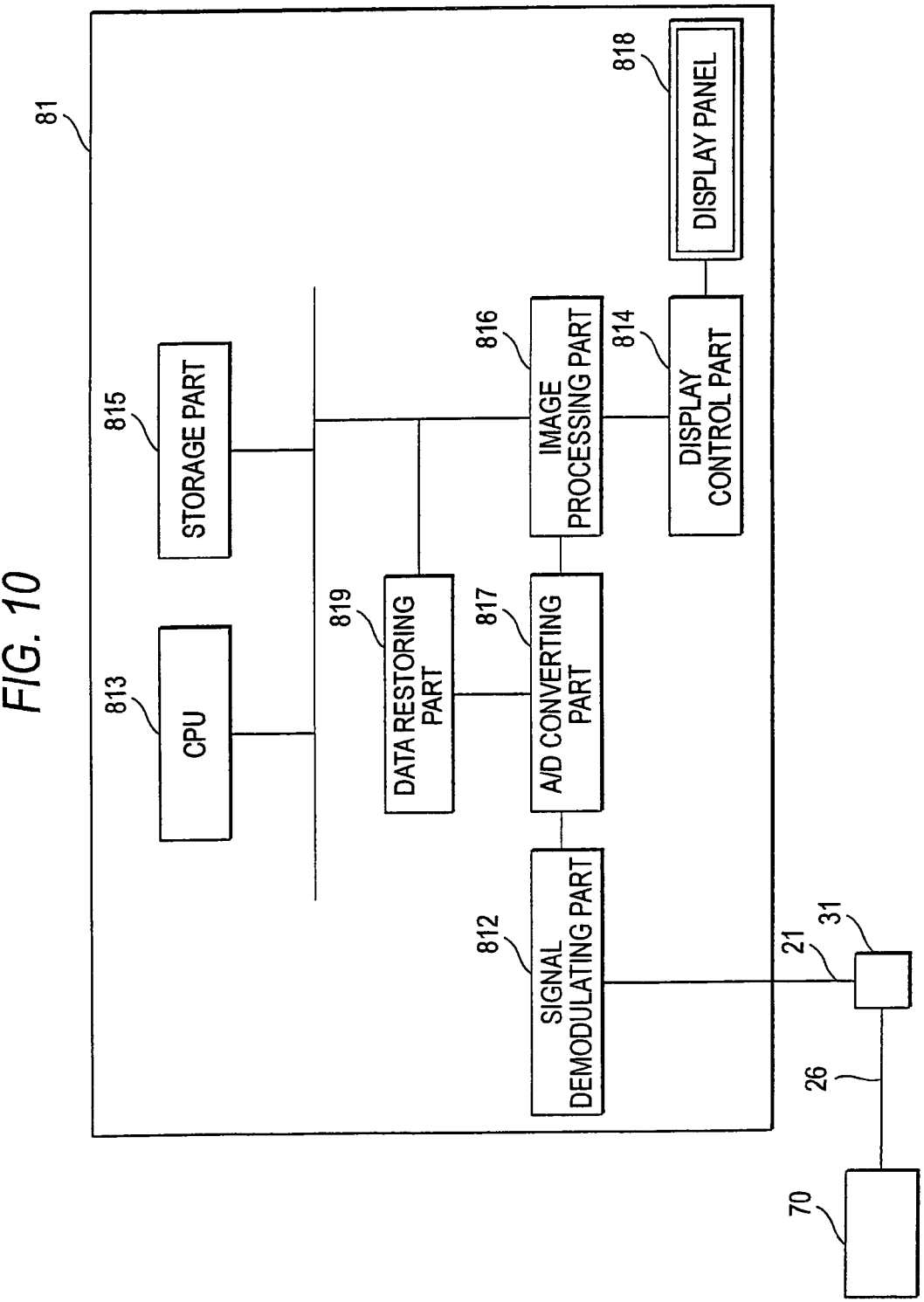
FIG. 10 is a structural view of a video information receiving and display device 81 according to Embodiment 2.

FIG. 10 shows the internal structure of, for example, the video information receiving and display device 81, according to Embodiment 2. An A/D converting part 817 demultiplexes the signal multiplexed to the VBI area of the analog video signal, and a data restoring part 819 restores the static image video information and display command. The description of the other blocks and the processing to display the restored static image video information, display command and dynamic image video information on a display panel 818 are the same as in the description of FIG. 4 in Embodiment 1.

As described above, in Embodiment 2 of this invention, since the existing digital transmission line such as a transmission line between train information devices is not necessary for sending static image video information and a display command, any trouble of I/F caused by using a transmission line of another system (system constituted by train information devices), and complication of software of another system can be avoided. Also, since no additional digital transmission line is necessary, even if the existing transmission line of a train information device or the like cannot be used when newly introducing the video information distribution and display system, the transmission lines necessary for construction of the system can be reduced and the cost can be significantly reduced.

The dynamic image signal in Embodiment 2 is of the NTSC video signal system, as an example. However, the PAL system and the SECAM system, which are other analog color video signal systems, can be similarly applied. As for the multiplexing method, the frequency multiplexing method, or if dynamic image video information is to be digitally transmitted, the TDM (time-division multiplex) system or the like has a similar effect, other than the method of inserting to a VBI area of an analog video signal.

In the above-described embodiments, the video information receiving and display system carried on a train is described. However, the invention can be applied to a video information receiving and display system for other vehicles than a train, for example, for a bus, aircraft or the like, or a video information receiving and display system in a building or outdoors.

The invention claimed is:

1. A video information distribution and display system comprising:
   a video information distribution device that distributes and outputs video information including dynamic image video information and processed digital static image video information, and an image control signal; and
   a video information receiving and display device that receives and displays the video information,
   wherein the video information receiving and display device restores in advance a state before processing of processed digital static image video information of a next static image to be displayed, in accordance with an instruction of the image control signal, and stands by for the next display,
   wherein the video information distribution device comprises a schedule management section generating the image control signal on the basis of schedule data which specifies an order and duration of displaying the dynamic image video information and the processed digital static image video information,
   wherein when video information that cannot be scheduled is to be displayed, the schedule management section compares timing associated with the schedule data and timing associated with the video information that cannot be scheduled to determine a timing for generating an interrupt image control signal.

2. The video information distribution and display system as claimed in claim 1, wherein the dynamic image video information is transmitted via a first transmission line and the processed digital static image video information is transmitted via a second transmission line.

3. The video information distribution and display system as claimed in claim 1, wherein the video information distribution device multiplexes the processed digital static image video information to the dynamic image video information and thus distributes and outputs the information, and the video information receiving and display device demultiplexes the processed digital static image video information from the multiplexed dynamic image video information.

4. The video information distribution and display system as claimed in claim 1, further comprising first and second storage areas, wherein static image data of each image to be displayed is restored and stored in a sequential alternative fashion in one of the first storage area or the second storage area.

5. The video information distribution and display system as claimed in claim 4, wherein the sequential alternative fashion that determines an order of storage in one of the first storage area or the second storage area is determined from content designation information contained in the image control signal.

6. The video information distribution and display system as claimed in claim 1, wherein the processed digital static image video information includes information for displaying a greater image resolution than the dynamic image video information.

7. The video information distribution and display system as claimed in claim 1, wherein the video information receiving and display device comprises two storage areas for storing the static image to be displayed, and the static image to be displayed the next time is previously stored to any one of the storage areas.

8. The video information distribution and display system as claimed in claim 7, wherein a duration of displaying each segment of the video information is a duration longer than a duration for the segment to be stored to one of the storage areas by returning the segment to a state before the processed digital static image video information is processed in the video information receiving and display device.

9. The video information distribution and display system as claimed in claim 1, wherein, the schedule management section outputs an interrupt image control signal to the video information receiving and display device that is collated with the schedule data.

10. A video information distribution and display system having:
   a video information distribution device that distributes plural video information comprising dynamic image video information and compressed digital static image video information, and an image control signal, for displaying the dynamic and static video information by a predetermined schedule, and
   a video information receiving and display device that receives and displays the video information, wherein
   the video information receiving and display device comprises two storage areas for storing static images to be displayed, decompresses the compressed digital static image video information of a static image to be displayed next on the basis of an instruction of the image control signal, up to a time at which a display of the next static image to be displayed is started, and stores the static image to be displayed next to any one of the storage areas to thereby previously stand by while being prepared for the next display, the video information distribution device comprises a schedule management section generating the image control signal on the basis of schedule data in which a display order and a display time of the dynamic and static video information are specified in a case where the display time of each of the plural video information is a time longer than a time at which the compressed digital static image video information is decompressed in the video information receiving and display device and stored to the storage area, and the schedule management section generates an interrupt image control signal for displaying video information not included in the schedule data in a case where the video information not included in the schedule data is to be displayed, immediately distributes the interrupt image control signal to the video information receiving and display device if a time up to a next image changeover is long in comparison with a time required for decompression and storage of the video information not included in the schedule data, and, if said time is short, distributes the interrupt image control signal to the video information receiving and display device after an image control signal changing over to a next image is transmitted.

11. The video information distribution and display system as claimed in claim 1, wherein the interrupt image control signal is generated immediately when the video information that cannot be scheduled is to be displayed.

12. The video information distribution and display system as claimed in claim 1, wherein the interrupt image control signal is generated at a next switching timing for displaying the dynamic image video information or a digital static image video included in the schedule data.

* * * * *